(12) United States Patent
Brothers et al.

(10) Patent No.: US 7,441,600 B2
(45) Date of Patent: Oct. 28, 2008

(54) CEMENT COMPOSITIONS WITH IMPROVED MECHANICAL PROPERTIES AND METHODS OF CEMENTING IN SUBTERRANEAN FORMATIONS

(75) Inventors: Lance E. Brothers, Chickasha, OK (US); Krishna M. Ravi, Kingwood, TX (US); Anthony V. Palmer, Ardmore, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/435,297

(22) Filed: May 9, 2003

(65) Prior Publication Data

US 2004/0221991 A1 Nov. 11, 2004

(51) Int. Cl.
*E21B 33/13* (2006.01)
(52) U.S. Cl. ............... 166/292; 166/293; 106/644; 106/672; 106/680; 106/682; 106/690; 106/692; 106/705; 106/713
(58) Field of Classification Search ............... 166/292, 166/293; 106/644, 672, 680, 682
See application file for complete search history.

(56) References Cited

U.S. PATENT DOCUMENTS

| | | | |
|---|---|---|---|
| 3,937,282 A | 2/1976 | Shryock et al. | |
| 3,957,522 A | 5/1976 | Matsuo et al. | |
| 4,042,409 A | 8/1977 | Terada et al. | |
| 4,111,710 A | 9/1978 | Pairaudeau et al. | 106/90 |
| 4,127,628 A | 11/1978 | Uchida et al. | |
| 4,304,298 A | 12/1981 | Sutton | 166/293 |
| 4,340,427 A | 7/1982 | Sutton | 106/87 |
| 4,367,093 A * | 1/1983 | Burkhalter et al. | 166/293 |
| 4,450,010 A | 5/1984 | Burkhalter et al. | 106/87 |
| 4,565,578 A | 1/1986 | Sutton et al. | 106/87 |
| 4,759,988 A * | 7/1988 | Yamamoto et al. | 428/402 |
| 4,784,223 A * | 11/1988 | Worrall et al. | 166/287 |
| 4,871,395 A * | 10/1989 | Sugama | 106/678 |
| 4,927,462 A | 5/1990 | Sugama | 106/99 |
| 5,030,282 A * | 7/1991 | Matsuhashi et al. | 106/692 |
| 5,298,071 A * | 3/1994 | Vondran | 106/757 |
| 5,308,696 A * | 5/1994 | Hanashita et al. | 428/357 |
| 5,339,902 A * | 8/1994 | Harris et al. | 166/293 |
| 5,368,934 A * | 11/1994 | Torii et al. | 428/372 |
| 5,588,489 A * | 12/1996 | Chatterji et al. | 166/293 |
| 5,652,058 A * | 7/1997 | Nagata et al. | 428/378 |
| 5,679,149 A * | 10/1997 | Tezuka et al. | 106/644 |
| 5,718,292 A | 2/1998 | Heathman et al. | 166/387 |
| 5,820,670 A * | 10/1998 | Chatterji et al. | 106/727 |
| 5,855,663 A * | 1/1999 | Takano et al. | 106/688 |
| 5,900,053 A | 5/1999 | Brothers et al. | 106/678 |
| 5,996,693 A * | 12/1999 | Heathman | 166/291 |
| 6,059,035 A | 5/2000 | Chatterji et al. | 166/293 |
| 6,059,036 A | 5/2000 | Chatterji et al. | 166/294 |
| 6,063,738 A | 5/2000 | Chatterji et al. | 507/269 |
| 6,143,069 A | 11/2000 | Brothers et al. | 106/678 |
| 6,210,476 B1 | 4/2001 | Chatterji et al. | 106/677 |
| 6,214,454 B1 | 4/2001 | Kanda et al. | 428/294.7 |
| 6,220,354 B1 | 4/2001 | Chatterji et al. | 166/293 |
| 6,230,804 B1 | 5/2001 | Mueller et al. | 166/293 |
| 6,308,777 B2 | 10/2001 | Chatterji et al. | 166/293 |
| 6,367,550 B1 | 4/2002 | Chatterji et al. | 166/293 |
| 6,458,198 B1 | 10/2002 | Baret et al. | 106/644 |
| 6,488,763 B2 | 12/2002 | Brothers et al. | 106/692 |
| 6,500,252 B1 | 12/2002 | Chatterji et al. | 106/644 |
| 6,619,399 B1 * | 9/2003 | Chatterji et al. | 166/293 |
| 6,723,162 B1 * | 4/2004 | Cheyrezy et al. | 106/644 |
| 6,729,405 B2 * | 5/2004 | DiLullo et al. | 166/292 |
| 6,739,806 B1 * | 5/2004 | Szymanski et al. | 405/267 |
| 6,962,201 B2 | 11/2005 | Brothers | |

FOREIGN PATENT DOCUMENTS

| | | | |
|---|---|---|---|
| CN | 1156705 | | 10/1915 |
| JP | 02048474 | | 7/1936 |
| JP | 02275739 | | 3/1942 |
| JP | 82051703 B | * | 11/1982 |
| JP | 82059635 B | * | 12/1982 |
| JP | 62277490 | * | 12/1987 |
| JP | 2001240452 | * | 9/2001 |
| JP | 07066584 | | 6/2006 |
| KR | 9604375 | * | 4/1996 |
| WO | WO 02/16282 A1 | * | 2/2002 |

OTHER PUBLICATIONS

"Light Concrete in Sweden" Ryehner, Schweizerische Bauzeitung (1952), 70, 155-9. Abstract only.*

Publication entitled "Interfaces and Mechanical Behaviors of Fiber-Reinforced Calcium Phosphate Cement Compositions", by T. Sugama, et al. Prepared for the Geothermal Division U.S. Department of Energy; Department of Applied Science, Jun. 1992, but admitted to be prior art.

(Continued)

Primary Examiner—Paul Marcantoni
(74) Attorney, Agent, or Firm—Craig W. Roddy; Baker Botts, LLP.

(57) ABSTRACT

The present invention provides foamed cement compositions with improved mechanical properties and methods of cementing in subterranean formations, particularly in conjunction with subterranean well operations. The foamed cement compositions comprise carbon fibers, a hydraulic cement material, sufficient water to form a slurry, an expanding additive, and optionally other ingredients including a weighting agent, a retarding or accelerating agent, or the like.

31 Claims, No Drawings

OTHER PUBLICATIONS

Halliburton brochure entitled "MicroBond Expanding Additive for Cement" Dated 1999.
Halliburton brochure entitled "MicroBond HT Cement Additive" dated 1999.
Halliburton brochure entitled "MicroBond M Cement Additive" dated 1999.
Halliburton brochure entitled "Super CBL Additive Cement Additive" Dated 1999.
Halliburton brochure entitled "ThermaLock™ Cement For Corrosive $CO_2$ Environments" dated 1999.
Foreign communication from a related counterpart application dated Jul. 27, 2004.
Office Action for U.S. Appl. No. 11/099,002 dated Jun. 29, 2005.
Office Action for U.S. Appl. No. 11/099,002 dated Nov. 21, 2005.
Office Action for U.S. Appl. No. 11/099,002 dated Aug. 15, 2006.
Office Action for U.S. Appl. No. 11/099,002 dated Feb. 9, 2007.
Notice of Allowability for U.S. Appl. No. 11/099,002 dated Jul. 12, 2007.
Abstract entitled "Fire-Resistant Coating Compositions for Building Materials" by Tokimoto et al., dated Jan. 25, 1993.
Foreign communication from a related counterpart application dated Nov, 2, 2004.

* cited by examiner

CEMENT COMPOSITIONS WITH IMPROVED MECHANICAL PROPERTIES AND METHODS OF CEMENTING IN SUBTERRANEAN FORMATIONS

BACKGROUND OF THE INVENTION

1. Field of the Invention

The present invention relates to foamed cementing operations in subterranean zones, and more particularly, to foamed well cement compositions having improved mechanical properties and methods of using the compositions in subterranean well cementing operations.

2. Description of the Prior Art

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks in holes in pipe strings, and the like.

Cement compositions utilized in well applications must often be lightweight to prevent excessive hydrostatic pressure from being exerted on subterranean formations penetrated by the well bore whereby the formations are unintentionally fractured. Thus, foamed cement compositions are often used in subterranean well applications. In addition to being lightweight, a foamed cement composition contains compressed gas which improves the ability of the composition to maintain pressure and prevent the flow of formation fluids into and through the cement composition during its transition time, i.e., the time during which the cement composition changes from a true fluid to a hard set mass. Foamed cement compositions are also advantageous because they have low fluid loss properties. Additionally, foamed cements have a lower modulus of elasticity than non-foamed cements, which is desirable as it enables the cement, inter alia, to resist hoop stresses when the cement encases pipe that expands from internal pressures.

A stable foamed cement may be generated in situ in circumstances such as when the cement composition contains an expanding additive, such as a fine aluminum powder, that generates a gas within the composition as it reacts with the high pH of the cement slurry. In other cases, a stable foamed cement may be generated when Portland cement, or any other hydraulic cement, has air or a compressed gas such as nitrogen injected with proper surfactants.

Set cement in subterranean formations, and particularly the set cement sheath in the annulus of a well bore, may fail due to, inter alia, shear and compressional stresses exerted on the set cement. This may be particularly problematic in hostile subterranean formations. In these types of formations, set cements often fail as a result of the stresses exerted on the set cement.

The stress exerted on the cement as referred to herein means the force applied over an area resulting from the strain caused by the incremental change of a body's length or volume. The stress is generally thought to be related to strain by a proportionality constant known as Young's Modulus. Young's Modulus is known to characterize the flexibility of a material.

There are several stressful conditions that have been associated with well bore cement failures. One example of such a condition results from the relatively high fluid pressures and/or temperatures inside of the set casing during testing, perforation, fluid injection, or fluid production. If the pressure and/or temperature inside the pipe increase, the resultant internal pressure expands the pipe, both radially and longitudinally. This expansion places stress on the cement surrounding the casing causing it to crack, or the bond between the outside surface of the pipe and the cement sheath to fail in the form of, inter alia, loss of hydraulic seal. Another example of such a stressful condition is where the fluids trapped in a cement sheath thermally expand causing high pressures within the sheath itself. This condition often occurs as a result of high temperature differentials created during production or injection of high temperature fluids through the well bore, e.g., wells subjected to steam recovery processes or the production of hot formation fluids. Other stressful conditions that can lead to cement failures include the forces exerted by shifts in the subterranean formations surrounding the well bore or other over-burdened pressures.

Failure of cement within the well bore can result in radial or circumferential cracking of the cement as well as a breakdown of the bonds between the cement and the pipe or between the cement sheath and the surrounding subterranean formations. Such failures can result in at least lost production, environmental pollution, hazardous rig operations, and/or hazardous production operations. A common result is the undesirable presence of pressure at the well head in the form of trapped gas between casing strings. Additionally, cement failures can be particularly problematic in multi-lateral wells, which include vertical or deviated (including horizontal) principal well bores having one or more ancillary, laterally extending well bores connected thereto.

In both conventional single bore wells and multi-lateral wells having several bores, the cement composition utilized for cementing casing or liners in the well bores must develop high bond strength after setting and also have sufficient resiliency, e.g., elasticity and ductility, to resist loss of pipe or formation bonding, cracking and/or shattering as a result of all of the stressful conditions that may plague the well, including impacts and/or shocks generated by drilling and other well operations.

Because a typical foamed cement composition will have a lower tensile strength than typical non-foamed cement, a foamed cement is more susceptible to these stressful conditions. As a result, foamed cements may not be as useful in subterranean applications.

SUMMARY OF THE INVENTION

The present invention provides a foamed cement composition having improved mechanical properties including tensile strength and elasticity, and methods for using same.

A preferred method of the present invention comprises the steps of providing a cement composition comprising an expanding additive and carbon fibers, introducing the cement composition to a subterranean well bore, and allowing the expanding additive to generate a gas within the cement composition before the cement composition develops substantial compressive strength. Another preferred method of the present invention comprises the steps of providing a cement composition comprising an expanding additive and carbon fibers, allowing the cement composition to form a foamed cement, placing the foamed cement composition into the well bore, and allowing it to set therein.

One embodiment of the cement compositions of the present invention involves addition of carbon fibers to a foamed cement composition. Optionally, other additives suitable for cement compositions such as retardants, accelerants, weighting agents, fluid loss agents, and the like may be added to the foamed cement compositions of the present invention.

The objects, features and advantages of the present invention will be readily apparent to those skilled in the art upon a reading of the description of the preferred embodiments, which follows.

DESCRIPTION OF PREFERRED EMBODIMENTS

The present invention provides cement compositions having improved mechanical properties, including elasticity and tensile strength, and methods of utilizing these cement compositions in subterranean cementing applications. While the compositions and methods are useful in a variety of subterranean applications, they are particularly useful for subterranean well completion and remedial operations, such as primary cementing, e.g., cementing casings and liners in well bores, including those in multi-lateral subterranean wells.

The improved cement compositions of the present invention generally comprise a cement composition that further comprises a hydraulic cement, carbon fibers, water sufficient to form a pumpable slurry, and an expanding additive capable of causing a gas to become incorporated within the cement composition. This incorporation of a gas by an method into the cement composition is referred to herein as "foaming" the cement composition, resulting in a "foamed cement." The expanding additive may be a gas or any other additive, such as a particulate additive, that causes the incorporation of a gas within the composition at a desired point in the process. Other additives suitable for use in subterranean well bore cementing operations also may be added to these compositions if desired.

Any cements suitable for use in subterranean applications are suitable for use in the present invention. Preferably, in one embodiment, the improved cement compositions of the present invention comprise a hydraulic cement. A variety of hydraulic cements are suitable for use including those comprised of calcium, aluminum, silicon, oxygen, and/or sulfur, which set and harden by reaction with water. Such hydraulic cements include but are not limited to, Portland cements, pozzolana cements, gypsum cements, high alumina content cements, silica cements, and high alkalinity cements. One example of a cement is commercially available under the trade designation "THERMALOCK" available from Halliburton Energy Services in Duncan, Okla., which is a calcium phosphate cement, described further in U.S. Pat. No. 6,488,763, which is assigned to the assignee of the present application and is incorporated herein by reference. Preferably, however, where the expanding additive is a particulate, the most suitable cements are Portland cements or any other cements which have a suitably high pH, preferably above 12. Where the expanding additive is a gas, any cement suitable for use in subterranean well cementing operations may be used.

The water utilized in the cement compositions of this invention can be fresh water, salt water (e.g., water containing one or more salts dissolved therein), brine (e.g., saturated salt water produced from subterranean formations), or seawater. Generally, the water can be from any source provided that it does not contain an excess of compounds that adversely affect other components in the cement composition. The water may be present in an amount sufficient to form a pumpable slurry. More particularly, the water is present in the cement compositions in an amount in the range of from about 25% to about 100% by weight of cement therein, more preferably in the range of from about 30% to about 50% by weight of cement material therein.

The carbon fibers that are present in the cement compositions of the present invention are preferably high tensile modulus carbon fibers which most preferably have a high tensile strength. In certain preferred embodiments, to achieve certain of the advantages associated with the present invention, the tensile modulus of the fibers exceeds 180 GPa, and the tensile strength of the fibers may exceed 3000 MPa. The fibers preferably have a mean length of about 1 mm or less. In certain preferred embodiments, the mean length of the carbon fibers is from about 50 to about 500 microns. Most preferably, the fibers have a mean length in the range of from about 100 to about 200 microns. Preferably, they are milled carbon fibers. An example of suitable carbon fibers includes "AGM-94" carbon fibers commercially available from Asbury Graphite Mills, Inc., of Asbury, N.J. AGM-94 fibers have a mean length of about 150 microns and a diameter of about 7.2 microns. Another example of suitable carbon fibers includes the "AGM-99" carbon fibers, also available from Asbury Graphite Mills, Inc., which have a mean length of about 150 microns and a diameter of about 7.4 microns. Preferably, the carbon fibers are present in the amount of from about 1% by weight of cement to about 15% by weight of cement in the cement composition.

The expanding additive may be any component suitable for performing the desired function of incorporating gas into the cement composition. Further, foaming of the cement composition can be accomplished by any suitable method. In one preferred embodiment, the cement is foamed by direct injection of the expanding additive into the composition. For instance, where the cement composition is foamed by the direct injection of gas into the composition, the gas utilized can be air or any suitable inert gas, such as nitrogen, or even a mixture of such gases. Preferably, nitrogen is used. Where foaming is achieved by direct injection of gas, the gas is present in the composition in an amount sufficient to foam the composition, generally in an amount in the range of from about 0.01% to about 60% by volume of the composition. In another preferred embodiment, the cement is foamed by gas generated by a reaction between the cement slurry and an expanding additive present in the cement in particulate form. For example, the composition may be foamed by hydrogen gas generated in situ as the product of a reaction between the high pH slurry and fine aluminum powder present in the cement. Where an expanding additive in particulate form is used, aluminum powder, gypsum blends, and deadburned magnesium oxide are preferred. Preferred expanding additives comprising aluminum powder are commercially available under the tradenames "GAS-CHEK®" and "SUPER CBL" from Halliburton Energy Services of Duncan, Okla.; a preferred expanding additive comprising a blend containing gypsum is commercially available under the tradename "MICROBOND" from Halliburton Energy Services of Duncan, Okla.; and preferred expanding additives comprising deadburned magnesium oxide are commercially available under the tradenames "MICROBOND M" and "MICROBOND HT" from Halliburton Energy Services of Duncan, Okla. Such preferred expanding additives are described in U.S. Pat. Nos. 4,304,298; 4,340,427; 4,367,093; 4,450,010 and 4,565,578, which are assigned to the assignee of the present application and are incorporated herein by reference.

Where the expanding additive is a gas, foaming of the cement composition is preferably achieved at the surface, and the foamed cement composition is then introduced into the subterranean formation and permitted to set therein into a high strength, resilient, ductile and tough foamed cement mass.

It has been found that foaming a cement composition affects the mechanical properties of the cement composition by, inter alia, reducing its density and improving its elasticity. This may be desirable for certain reasons. However, when a cement composition is foamed sufficiently to desirably affect the elasticity of the cement, the tensile strength of the cement may be adversely affected. The risk of rupture of the cement sheath in response to a stressful condition is directly linked to the tensile strength of the cement, and the risk is attenuated when the ratio of the tensile strength of the cement to its Young's Modulus is increased. Thus, increasing the tensile strength of the cement by adding carbon fibers is desirable to increase the tensile strength of the foamed cement composition. Also, adding carbon fibers as opposed to other additives, such as polypropylene, has the added benefit of providing increased temperature stability to the cement composition. This makes the cement compositions of the present invention especially suitable for use in or in conjunction with hostile subterranean conditions, such as high temperatures and/or high pressures.

As will be recognized by those skilled in the art, when the cement compositions of the present invention are utilized for primary or remedial subterranean well operations, such compositions can also include additional suitable additives, for example, fluid loss agents, weighting materials, and the like. The foamed cement compositions of the present invention also can include other additives such as accelerants or retarders, if desired. If an accelerant is used, the accelerant is preferably calcium chloride and is present in an amount in the range from about 1.0% to about 2.0% by weight of the cement in the compositions. Fluid loss additives such as hydroxyethylcellulose, carboxymethylcellulose, carboxymethylhydroxyethylcellulose, hydroxypropylcellulose, hydroxypropylguar, guar, polyvinylalcohol, or polyvinylacetate are also suitable. Where the cement composition is foamed by the direct injection of a gas or mixture of gases, a surfactant may also be present in the cement composition. Any commercially available surfactant may be used. An example is "ZONESEAL 2000™," commercially available from Halliburton Energy Services, Inc., which is described in U.S. Pat. No. 6,063,738, which is assigned to the assignee of the present application and is incorporated herein by reference.

A preferred method of the present invention comprises providing a cement composition that comprises carbon fibers; injecting sufficient gas into the composition to foam it to a chosen density; introducing this foamed cement composition to a subterranean well bore; and allowing the foamed cement composition to set therein. An example of a preferred cement composition prepared by this method is a composition of Class A Portland cement, sufficient water to form a pumpable slurry, sufficient gas to foam the composition to a density of 12 lb/gallon, 2% ZONESEAL 2000™ surfactant by weight of water, and 5% milled carbon fibers having a mean length of 150 microns by weight of the cement in the composition.

Another preferred method of the present invention comprises providing a cement composition that comprises carbon fibers, water and an expanding additive in particulate form; introducing this cement composition into a subterranean well bore; evolving gas within the cement composition prior to developing substantial compressive strength; and then permitting the composition to set therein. An example of a composition prepared by this method is a composition comprising Class A Portland cement, 46% water by weight of the cement, 1% SUPER CBL expanding additive by weight of cement, and 10% milled carbon fibers having a mean length of 150 microns by weight of the cement in the composition.

To facilitate a better understanding of the present invention, the following examples of some of the preferred embodiments are given. In no way should such examples be read to limit the scope of the invention.

EXAMPLE 1

Test samples of preferred embodiments of the cement compositions of the present invention were made and the tensile strength of each composition was determined. Comparative samples were also made and similarly tested. The test foamed cement compositions depicted in Example 1 were prepared by mixing Class A Portland Cement with 46% by weight of the cement water, and foamed with air to a density of 12 lb/gallon. ZONESEAL 2000™ surfactant was added to the foamed cement in an amount equal to 2% by weight of water, and the composition was cured for 24 hours at ambient temperature. To certain sample cement compositions, carbon fibers were added in chosen ratios as described in Table 1. The carbon fibers were milled fibers, specifically AGM-99 fibers from Asbury Graphite Mills Inc., with a mean length of 150 microns and a diameter of 7.4 microns. The tensile strength of each cement composition was then determined in accordance with ASTM C496-96.

Table 1 below lists the percentage of carbon fibers that were added to each cement composition and the resultant tensile strength.

TABLE 1

| Sample Description | Water-to-Cement Ratio | Milled Carbon Fibers (% by weight of cement) | Tensile Strength (psi) |
|---|---|---|---|
| Comparative Sample No. 1 | 0.46 | 0 | 115 |
| Comparative Sample No. 2 | 0.46 | 5 | 160 |

Comparative Sample No. 1 illustrates the tensile strength of a foamed cement composition when no carbon fibers have been added to the composition. The tensile strength was 115 psi.

Comparative Sample No. 2 illustrates the tensile strength of a foamed cement composition containing carbon fibers. The tensile strength was 160 psi, a 39% increase from Comparative Sample No. 1.

EXAMPLE 2

The test foamed cement compositions depicted in Example 2 were prepared by mixing Class A Portland Cement with 46% water by weight of the cement, and 1% SUPER CBL expanding additive by weight of the cement. The composition was cured for 24 hours at 150° F. To certain sample cement compositions, carbon fibers were added in chosen ratios as described in Table 2. The carbon fibers were milled fibers, specifically AGM-94 fibers from Asbury Graphite Mills Inc., with a mean length of 150 microns and a diameter of 7.2 microns. The tensile strength of each cement composition was then determined in accordance with ASTM C496-96.

Table 2 below lists the percentage of carbon fibers that were added to each cement composition and the resultant tensile strength.

TABLE 2

| Sample Description | Water-to-Cement Ratio | Milled Carbon Fibers (% by weight of cement) | Tensile Strength (psi) |
|---|---|---|---|
| Comparative Sample No. 3 | 0.46 | 0 | 258 |
| Comparative Sample No. 4 | 0.46 | 10 | 418 |

Comparative Sample No. 3 illustrates the tensile strength of a foamed cement composition when no carbon fibers have been added to the composition. The tensile strength was 258 psi.

Comparative Sample No. 4 illustrates the tensile strength of a foamed cement composition containing carbon fibers. The tensile strength was 418 psi, a 62% increase from Comparative Sample No. 3.

EXAMPLE 3

It has been noted that lower water-to-cement ratios may affect realized tensile strength. Sample cement compositions were prepared by mixing Class A Portland Cement with 38% water by weight of the cement, and foamed with air to a density of 12 lb/gallon. ZONESEAL 2000™ surfactant was added to the foamed cement in an amount equal to about 2% by weight of water, and the composition was cured for 24 hours at 90° F. Carbon fibers were added to one sample composition in an amount equal to 5% by weight of the cement. The carbon fibers were milled fibers, specifically AGM-99 fibers from Asbury Graphite Mills Inc., with a mean length of 150 microns and a diameter of 7.4 microns. The tensile strength of each cement composition was then determined in accordance with ASTM C496-96. The sample containing carbon fibers demonstrated a 6.0% increase in tensile strength as compared to the sample which lacked carbon fibers.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of cementing in a well bore comprising:
   providing a cement composition consisting essentially of a hydraulic cement, water, carbon fibers, the carbon fibers having a mean length of about 500 microns or less, a retardant, and an expanding additive selected from the group consisting of one or more gases, aluminum, gypsum, and magnesium oxide;
   placing the cement composition within the well bore; and
   allowing the cement composition to set therein.

2. The method of claim 1 wherein the cement composition is selected from the group consisting of a Portland cement, a pozzolana cement, a gypsum cement, a high alumina content cement, a silica cement, a high alkalinity cement, and a calcium phosphate cement.

3. The method of claim 1 wherein the carbon fibers are present in an amount of from about 1% to about 15% by weight of the cement in the cement composition.

4. The method of claim 1 wherein the carbon fibers have a mean length of about 50 to about 200 microns.

5. The method of claim 1 wherein the cement composition has a tensile strength greater than about 115 psi.

6. The method of claim 1 wherein the gas in the cement composition is selected from the group consisting of air, nitrogen and a mixture thereof.

7. The method of claim 1 wherein the water is present in the cement composition in an amount in the range of from about 25% to about 100% by weight of cement.

8. The method of claim 1 wherein the water is present in the cement composition in an amount in the range of from about 30% to about 50% by weight of cement.

9. The method of claim 1 wherein the carbon fibers have a mean length of about 150 microns, wherein the water is present in the cement composition in an amount in the range of from about 30% to about 50% by weight of cement, and wherein the tensile strength of the foamed cement is greater than about 115 psi.

10. A method of cementing in a well bore comprising:
    providing a cement composition capable of being foamed consisting essentially of a hydraulic cement; water; carbon fibers, the carbon fibers having a mean length of about 1 mm or less; a retardant and an expanding additive;
    placing the cement composition into the well bore; and
    allowing a gas to be produced in the cement composition before the cement composition develops compressive strength.

11. The method of claim 10 wherein the hydraulic cement is selected from the group consisting of a Portland cement, and a cement having a pH above about 12.

12. The method of claim 10 wherein the carbon fibers are present in an amount of from about 1% to about 15% by weight of the cement in the cement composition.

13. The method of claim 10 wherein the carbon fibers have a mean length of 150 microns or less.

14. The method of claim 10 wherein the cement composition has a tensile strength greater than about 258 psi.

15. The method of claim 10 wherein the expanding additive is selected from the group consisting of an aluminum powder, gypsum, and deadburned magnesium oxide.

16. The method of claim 10 wherein the water is present in the cement composition in an amount in the range of from about 25% to about 100% by weight of cement.

17. The method of claim 10 wherein the water is present in the cement composition in an amount in the range of from about 30% to about 50% by weight of cement.

18. The method of claim 10 wherein the expanding additive is selected from the group consisting aluminum, gypsum, and magnesium oxide; wherein the carbon fibers are present in an amount in the range of from about 1% to about 15% by weight of the cement, wherein the water is present in the cement composition in an amount in the range of from about 30% to about 50% by weight of the cement, and wherein the cement composition has a tensile strength greater than about 258 psi.

19. A method of cementing in a well bore comprising:
    providing a cement composition capable of being foamed consisting essentially of a hydraulic cement; water; an expanding additive; a retardant; and carbon fibers, the carbon fibers having a mean length of about 1 mm or less and present in amount of from about 1% by weight of the cement to about 15% by weight of the cement in the cement composition;
    placing the cement composition in a desired area within the well bore; and
    allowing a gas to become incorporated within the cement composition before the cement composition develops compressive strength.

20. The method of claim 19 wherein the expanding additive comprises one or more gases.

21. The method of claim 20 wherein the expanding additive is selected from the group consisting of air, nitrogen and a mixture thereof.

22. The method of claim 19 wherein the expanding additive is present in an amount in the range of from about 0.01% to about 60% of the volume of cement in the cement composition.

23. The method of claim 19 wherein the hydraulic cement is selected from the group consisting of a Portland cement, a pozzolana cement, a gypsum cement, a high alumina content cement, a silica cement, a calcium phosphate cement, and a high alkalinity cement.

24. The method of claim 19 wherein the carbon fibers have a mean length of about 150 microns.

25. The method of claim 19 wherein the cement composition has a tensile strength greater than about 115 psi.

26. The method of claim 19 wherein the water is present in the cement composition in an amount in the range of from about 25% to about 100% by weight of cement.

27. The method of claim 19 wherein the water is present in the cement composition in an amount in the range of from about 30% to about 50% by weight of cement.

28. The method of claim 19 wherein the expanding additive is selected from the group consisting of an aluminum powder, gypsum, and deadburned magnesium oxide.

29. The method of claim 28 wherein the hydraulic cement is selected from the group consisting of a Portland cement and a cement having a pH higher than about 12.

30. The method of claim 28 wherein the cement composition has a tensile strength greater than about 258 psi.

31. The method of claim 19 wherein the cement composition has a tensile strength greater than about 115 psi.

* * * * *